(12) United States Patent
Qiu et al.

(10) Patent No.: US 12,348,042 B2
(45) Date of Patent: Jul. 1, 2025

(54) PHOTOVOLTAIC ENERGY STORAGE SYSTEM AND CONTROL METHOD THEREOF

(71) Applicant: Delta Electronics (Shanghai) Co., Ltd., Shanghai (CN)

(72) Inventors: Jixing Qiu, Shanghai (CN); Shen Chen, Shanghai (CN); Feidong Xu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 289 days.

(21) Appl. No.: 17/570,166

(22) Filed: Jan. 6, 2022

(65) Prior Publication Data
US 2022/0239107 A1  Jul. 28, 2022

(30) Foreign Application Priority Data
Jan. 22, 2021 (CN) .......................... 202110086850.8

(51) Int. Cl.
| | | |
|---|---|---|
| H02J 3/38 | (2006.01) | |
| H02J 3/32 | (2006.01) | |
| H02J 7/00 | (2006.01) | |

(52) U.S. Cl.
CPC .............. *H02J 3/381* (2013.01); *H02J 3/32* (2013.01); *H02J 7/00712* (2020.01); *H02J 2300/24* (2020.01)

(58) Field of Classification Search
CPC ......... H02J 3/00; H02J 2300/00; H02S 40/00; H02S 50/00
See application file for complete search history.

(56) References Cited

U.S. PATENT DOCUMENTS

| | | | |
|---|---|---|---|
| 9,812,869 B2 | 11/2017 | Narla | |
| 2012/0039101 A1 | 2/2012 | Falk et al. | |
| 2013/0163301 A1* | 6/2013 | Fujii | H02M 7/487 |
| | | | 363/97 |

(Continued)

FOREIGN PATENT DOCUMENTS

| | | |
|---|---|---|
| CN | 101951181 A | 1/2011 |
| CN | 106981881 A | 7/2017 |

(Continued)

*Primary Examiner* — Rexford N Barnie
*Assistant Examiner* — Joseph N Inge
(74) *Attorney, Agent, or Firm* — KIRTON McCONKIE; Evan R. Witt (57) ABSTRACT

A photovoltaic energy storage system and a control method for the photovoltaic energy storage system are provided. The photovoltaic energy storage system includes an energy storage unit, a photovoltaic array assembly, an inverter and a rapid shutdown switch. The inverter is electrically coupled to the energy storage unit and the photovoltaic array assembly. The rapid shutdown switch is electrically coupled to the inverter, a power grid and a load. A detecting and controlling circuit of the inverter detects at least two of a first voltage, a second voltage and a third voltage, and determines whether the rapid shutdown switch is turned off according to the detected voltages and a reference value. When it is determined that the rapid shutdown switch is turned off, a connection between the inverter and the energy storage unit and a connection between the inverter and the photovoltaic array assembly are cut off.

21 Claims, 7 Drawing Sheets

(56) References Cited

U.S. PATENT DOCUMENTS

| | | | | |
|---|---|---|---|---|
| 2017/0207620 A1* | 7/2017 | Zhu | ............ | H02J 3/381 |
| 2017/0271875 A1* | 9/2017 | Narla | ............ | H02S 40/32 |
| 2020/0264215 A1* | 8/2020 | Wei | ............ | G01R 31/42 |

FOREIGN PATENT DOCUMENTS

| | | | |
|---|---|---|---|
| CN | 107769242 A | 3/2018 | |
| CN | 111211580 A | 5/2020 | |
| CN | 111585307 A | 8/2020 | |
| EP | 2242160 A1 | 10/2010 | |

\* cited by examiner

PHOTOVOLTAIC ENERGY STORAGE SYSTEM AND CONTROL METHOD THEREOF

CROSS-REFERENCE TO RELATED APPLICATION

This application claims priority to China Patent Application No. 202110086850.8, filed on Jan. 22, 2021, the entire contents of which are incorporated herein by reference for all purposes.

FIELD OF THE INVENTION

The present disclosure relates to a photovoltaic energy storage system and a control method, and more particularly to a photovoltaic energy storage system and a control method for cutting off the connection between an inverter and an energy storage unit and the connection between the inverter and a photovoltaic array assembly when an emergency event occurs.

BACKGROUND OF THE INVENTION

Nowadays, the integrated photovoltaic energy storage household system is widely used. The integrated photovoltaic energy storage household system includes an inverter, an energy storage unit (e.g., a battery) and a photovoltaic array assembly. According to the standard regulations, the connection between the photovoltaic array assembly and the inverter and the connection between the battery and the inverter must be cut off when the emergency event (e.g., a fire disaster) occurs. Consequently, the electric safety is enhanced.

In a conventional pure photovoltaic system, the inverter issues a shutdown command to turn off a rapid shutdown switch. Consequently, the connection between the photovoltaic array assembly and the inverter is cut off.

In a conventional photovoltaic energy storage system, it is necessary to cut off the connection between the photovoltaic array assembly and the inverter and the connection between the battery and the inverter when the emergency event occurs. Consequently, the designing complexity is increased.

In the conventional pure photovoltaic system, the shutdown command is generated when the AC power grid is shut down. That is, if the inverter detects the AC power decreases, the inverter issues the shutdown command to the rapid shutdown switch. However, this method is not applicable to the photovoltaic energy storage system as the photovoltaic energy storage system can still work normally when the AC power grid is disconnected. In other words, the inverter is unable to discriminate the abnormal situation (i.e., the emergency situation) from the normal off-grid mode.

Therefore, there is a need of providing an improved control method for the photovoltaic energy storage system in order to detect the occurrence of the emergency event and cut off the connection between an inverter and an energy storage unit and the connection between the inverter and a photovoltaic array assembly in response to the emergency event.

SUMMARY OF THE INVENTION

The present disclosure provides a photovoltaic energy storage system and a control method for cutting off the connection between an inverter and an energy storage unit and the connection between the inverter and a photovoltaic array assembly when an emergency event occurs.

The preset disclosure provides a photovoltaic energy storage system and a control method for the photovoltaic energy storage system. Even if the photovoltaic energy storage system is not equipped with the additional hardware component, the photovoltaic energy storage system is capable of accurately determining the occurrence of the emergency event and cutting off the connection between the inverter and an energy storage unit and the connection between the inverter and a photovoltaic array assembly when the emergency event occurs. Consequently, the technology of the present disclosure can comply with the associated safety standards.

In accordance with an aspect of the present disclosure, a control method for a photovoltaic energy storage system is provided. The photovoltaic energy storage system includes an energy storage unit, a photovoltaic array assembly, an inverter and a rapid shutdown switch. The inverter is electrically coupled to the energy storage unit and the photovoltaic array assembly. The rapid shutdown switch is electrically coupled to the inverter, a power grid and a load. The inverter includes a first terminal, a second terminal and a common terminal. A voltage between the first terminal and the common terminal is a first voltage. A voltage between the second terminal and the common terminal is a second voltage. A voltage between the first terminal and the second terminal is a third voltage. The control method includes the following steps. In a step (S1), at least two voltages of the first voltage, the second voltage and the third voltage are detected. Then, a step (S2) is performed to determine whether the rapid shutdown switch is turned off according to the at least two detected voltages and a reference value. In a step (S3), when it is determined that the rapid shutdown switch is turned off, a connection between the inverter and the energy storage unit and a connection between the inverter and the photovoltaic array assembly are cut off.

In accordance with another aspect of the present disclosure, a photovoltaic energy storage system is provided. The photovoltaic energy storage system includes an energy storage unit, a photovoltaic array assembly, an inverter and a rapid shutdown switch. The inverter is electrically coupled to the energy storage unit and the photovoltaic array assembly. The inverter includes a detecting and controlling circuit, and has a first terminal, a second terminal and a common terminal. A voltage between the first terminal and the common terminal is a first voltage. A voltage between the second terminal and the common terminal being a second voltage. A voltage between the first terminal and the second terminal is a third voltage. The rapid shutdown switch is electrically coupled to the inverter, a power grid and a load. The detecting and controlling circuit detects at least two voltages of the first voltage, the second voltage and the third voltage, and determines whether the rapid shutdown switch is turned off according to the at least two detected voltages and a reference value. When it is determined that the rapid shutdown switch is turned off, a connection between the inverter and the energy storage unit and a connection between the inverter and the photovoltaic array assembly are cut off.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
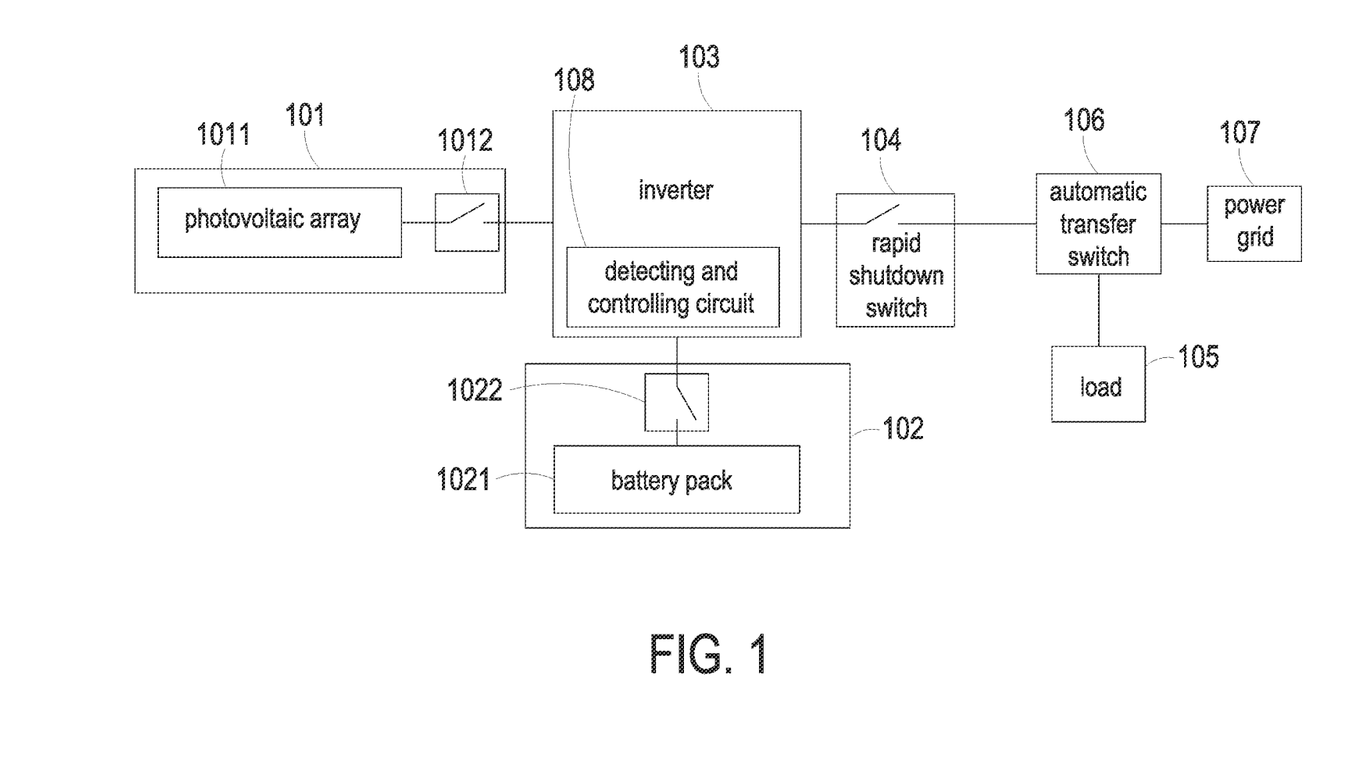
FIG. 1 is a schematic functional block diagram illustrating the circuitry structure of a photovoltaic energy storage system according to an embodiment of the present disclosure.
Figure 2:
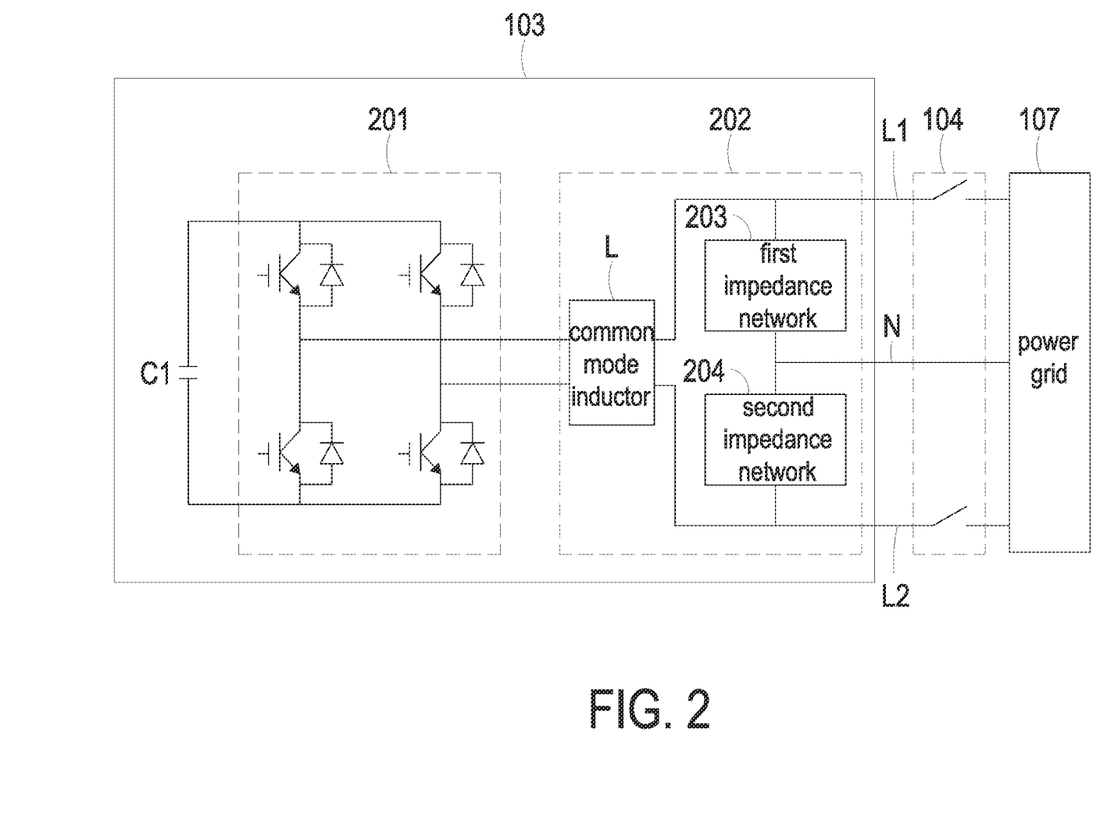
FIG. 2 is a schematic circuit diagram illustrating the inverter of the photovoltaic energy storage system as shown in FIG. 1.

FIG. 1 is a schematic functional block diagram illustrating the circuitry structure of a photovoltaic energy storage system according to an embodiment of the present disclosure. FIG. 2 is a schematic circuit diagram illustrating the inverter of the photovoltaic energy storage system as shown in FIG. 1.

As shown in FIG. 1, the photovoltaic energy storage system includes a photovoltaic array assembly 101, an energy storage unit 102 (e.g., a battery unit), an inverter 103 and a rapid shutdown switch 104. The inverter 103 is electrically coupled to the energy storage unit 102 and the photovoltaic array assembly 101. The rapid shutdown switch 104 is electrically coupled to the inverter 103, a power grid 107 and a load 105. The inverter 103 includes a detecting and controlling circuit 108. The detecting and controlling circuit 108 can determine whether the rapid shutdown switch 104 is turned off. When it is determined that the rapid shutdown switch 104 is turned off, the connection between the inverter 103 and the energy storage unit 102 and the connection between the inverter 103 and the photovoltaic array assembly 101 need to be cut off.

As shown in FIG. 2, the inverter 103 includes a DC bus capacitor C1, a full-bridge circuit 201, a filtering circuit 202 and at least one power consumption element. For example, the at least one power consumption element includes a fan and a relay. The AC side of the inverter 103 includes a first terminal L1, a second terminal L2 and a common terminal N. The common terminal N is electrically coupled to a neutral line of the power grid 107. The voltage $U_{L1N}$ between the first terminal L1 and the common terminal N is defined as a first voltage. The voltage $U_{L2N}$ between the second terminal L2 and the common terminal N is defined as a second voltage. The voltage $U_{L1L2}$ between the first terminal L1 and the second terminal L2 is defined as a third voltage. It is noted that the first voltage, the second voltage and the third voltage comply with a specified relationship. For example, if the first voltage and the second voltage are known, the third voltage is calculated according to the first voltage and the second voltage. Similarly, if the first voltage and the third voltage are known, the second voltage is calculated according to the first voltage and the third voltage. The DC side of the full-bridge circuit 201 is connected with the DC bus capacitor C1. The AC side of the full-bridge circuit 201 is connected with the filtering circuit 202. The filtering circuit 202 includes a first impedance network 203 and a second impedance network 204. The first impedance network 203 is electrically coupled between the first terminal L1 and the common terminal N. The second impedance network 204 is electrically coupled between the second terminal L2 and the common terminal N. The impedance value Z1 of the first impedance network 203 and the impedance value Z2 of the second impedance network 204 are not equal.

In some embodiments, the filtering circuit 202 further includes a common mode inductor L. The common mode inductor L is electrically coupled between the full-bridge circuit 201 and the power grid 107. For example, the common mode inductor L is connected between a midpoint of a first bridge arm of the full-bridge circuit 201 and the first terminal L1 and connected between a midpoint of a second bridge arm of the full-bridge circuit 201 and the second terminal L2.

Please refer to FIG. 2 again. When the photovoltaic energy storage system is in a normal working state, the rapid shutdown switch 104 is in a on state and the inverter 103 is connected with the power grid 107. Under this circumstance, the first voltage $U_{L1N}$ and the second voltage $U_{L2N}$ are maintained in the balanced state. When an emergency event occurs, the rapid shutdown switch 104 is turned off. For example, when one sees a fire, he will turn off the rapid shutdown switch 104 manually. As mentioned above, when an emergence event (e.g., a fire disaster) occurs, the connection between the photovoltaic array assembly 101 and the inverter 103 and the connection between the energy storage unit 102 must be immediately cut off according to the associated standards. In order to quickly respond to the emergency event, the inverter 103 is equipped with the detecting and controlling circuit 108 to determine whether the rapid shutdown switch 104 is indeed turned off. Especially, when the detecting and controlling circuit 108 confirms that the inverter 103 and the power grid 107 are disconnected, the inverter 103 is controlled to operate in a voltage source mode by the detecting and controlling circuit 108. Under this circumstance, the relationships between the first voltage $U_{L1N}$, the second voltage $U_{L2N}$ and the voltage $U_{L1L2}$ can be expressed by the following mathematic formulae:

$$U_{L1N}=Z1/(Z1+Z2)\times U_{L1L2} \quad (1)$$

$$U_{L2N}=Z2/(Z1+Z2)\times U_{L1L2} \quad (2)$$

After the first voltage $U_{L1N}$ and the second voltage $U_{L2N}$ are calculated and processed according to the mathematic formulae (1) and (2), the detecting and controlling circuit 108 acquires the degree of imbalance between the first voltage $U_{L1N}$ and the second voltage $U_{L2N}$. If the degree of imbalance exceeds a predetermined threshold, the detecting and controlling circuit 108 confirms that the rapid shutdown switch 104 between the inverter 103 and the power grid 107 is turned off.

In an embodiment, the energy storage unit 102 includes a battery pack 1021 and a battery pack switch 1022, which are connected with each other in series. For example, the battery pack 1021 is a chargeable battery. The battery pack switch 1022 is electrically coupled between the battery pack 1021 and the inverter 103. Moreover, the photovoltaic array assembly 101 includes a photovoltaic array 1011 and a photovoltaic array switch 1012, which are connected with each other in series. The photovoltaic array switch 1012 is electrically coupled between the photovoltaic array 1011 and the inverter 103.

Figure 3:
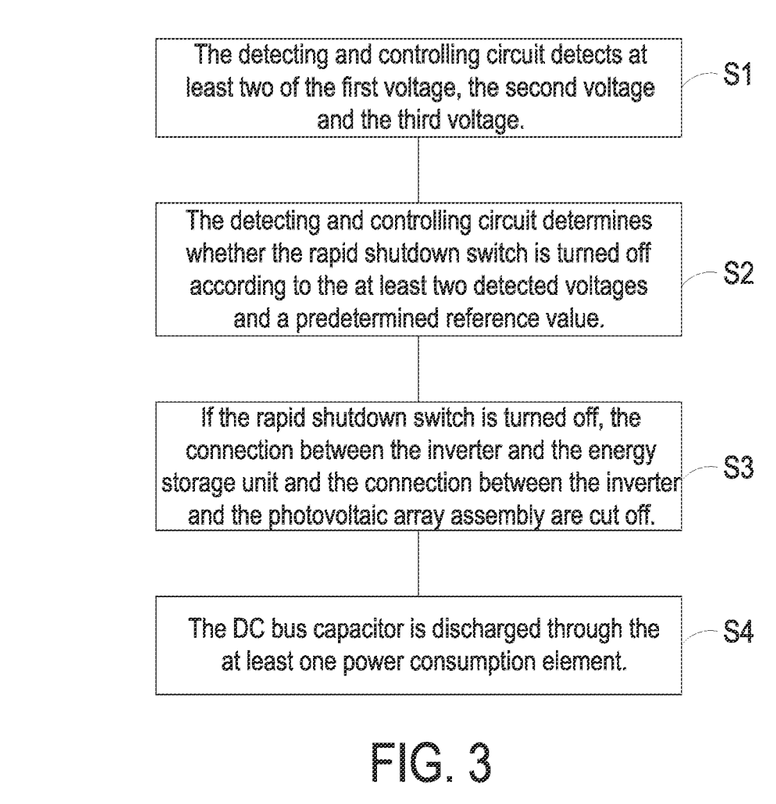
FIG. 3 schematically illustrates a flowchart of a control method for a photovoltaic energy storage system according to an embodiment of the present disclosure.

FIG. 3 schematically illustrates a flowchart of a control method for a photovoltaic energy storage system according to an embodiment of the present disclosure. The control method is applied to the photovoltaic energy storage system as shown in FIG. 1. The steps S1, S2 and S3 of the control method are used to determine whether the rapid shutdown switch 104 is turned off. When it is determined that the rapid shutdown switch 104 is turned off, the connection between the inverter 103 and the energy storage unit 102 and the connection between the inverter 103 and the photovoltaic array assembly 101 are cut off. Consequently, the security of the photovoltaic energy storage system in the emergency situation is enhanced.

Firstly, in the step S1, the detecting and controlling circuit 108 detects at least two of the first voltage $U_{L1N}$, the second voltage $U_{L2N}$ and the third voltage $U_{L1L2}$. Since the third voltage $U_{L1L2}$ is equal to the sum of the first voltage $U_{L1N}$ and the second voltage $U_{L2N}$, the detection of at least two of the first voltage $U_{L1N}$, the second voltage $U_{L2N}$ and the third voltage $U_{L1L2}$ can acquire all of the first voltage $U_{L1N}$, the second voltage $U_{L2N}$ and the third voltage $U_{L1L2}$.

Then, in the step S2, the detecting and controlling circuit 108 determines whether the rapid shutdown switch 104 is turned off according to the at least two detected voltages and a predetermined reference value.

When it is determined that the rapid shutdown switch 104 is turned off, the step S3 is performed. In the step S3, the connection between the inverter 103 and the energy storage unit 102 and the connection between the inverter 103 and the photovoltaic array assembly 101 are cut off. When the emergency event occurs, the rapid shutdown switch 104 is turned off. Consequently, the connection between the photovoltaic array assembly 101 and the inverter 103 and the connection between the energy storage unit 102 and the inverter 103 can be immediately cut off to comply with the associated standards.

In some embodiments, after the connection between the inverter 103 and the energy storage unit 102 and the connection between the inverter 103 and the photovoltaic array assembly 101 are cut off, a step S4 is performed. In the step S4, the DC bus capacitor C1 of the inverter 103 is discharged through the at least one power consumption element. By adjusting the discharge speed of the DC bus capacitor C1, the DC bus voltage can be quickly reduced to be within a safety range.

Figure 4:
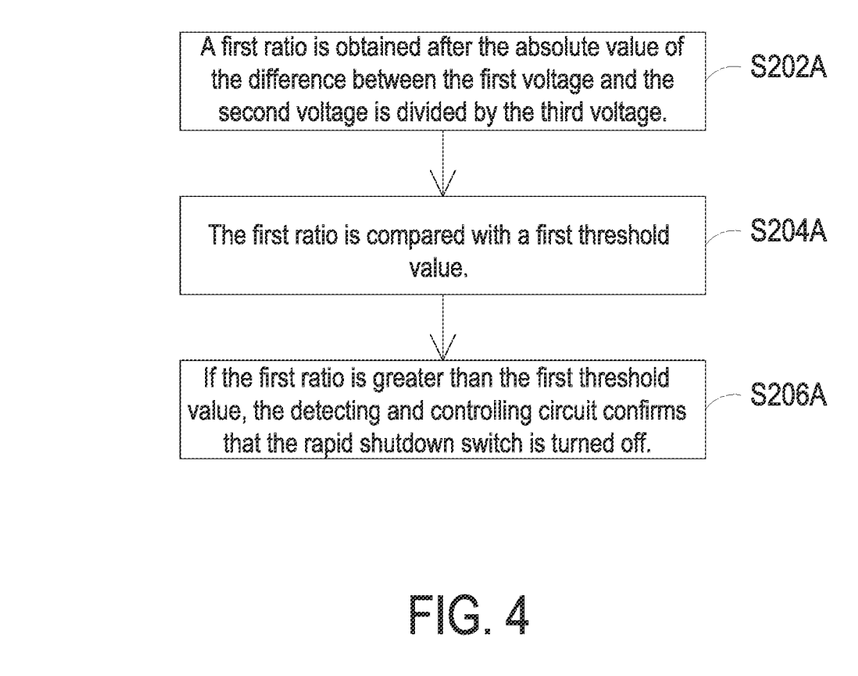
FIG. 4 is a flowchart illustrates a first example of the step S2 in the control method of FIG. 3.

FIG. 4 is a flowchart illustrates a first example of the step S2 in the control method of FIG. 3. In an embodiment, the step S2 includes sub-steps S202A, S204A and S206A.

In the sub-step S202A, a first ratio Q1 is obtained after the absolute value of the difference between the first voltage $U_{L1N}$ and the second voltage $U_{L2N}$ is divided by the third voltage $U_{L1L2}$. The first ratio Q1 can be expressed by the following mathematic formula:

$$Q1=|U_{L1N}-U_{L2N}|/U_{L1L2} \tag{3}$$

In other words, after the at least two of the first voltage $U_{L1N}$, the second voltage $U_{L2N}$ and the third voltage $U_{L1L2}$ are detected, the first ratio Q1 can be obtained according to the mathematic formula (3). For example, in case that the first voltage $U_{L1N}$ and the second voltage $U_{L2N}$ are detected by the detecting and controlling circuit 108, the third voltage $U_{L1L2}$ is calculated according to the first voltage $U_{L1N}$ and the second voltage $U_{L2N}$ and the first ratio Q1 is obtained according to the mathematic formula (3). For example, in case that the first voltage $U_{L1N}$ and the third voltage $U_{L1L2}$ are detected by the detecting and controlling circuit 108, the second voltage $U_{L2N}$ is calculated according to the first voltage $U_{L1N}$ and the third voltage $U_{L1L2}$ and the first ratio Q1 is obtained according to the mathematic formula (3). Alternatively, it is unnecessary to directly detect the at least two of the first voltage $U_{L1N}$, the second voltage $U_{L2N}$ and the third voltage $U_{L1L2}$. Other electrical parameters (e.g., voltages or currents) in the circuitry can also be detected to calculate the first ratio Q1 as long as these other electrical parameters can reflect at least two of the first voltage $U_{L1N}$, the second voltage $U_{L2N}$ and the third voltage $U_{L1L2}$. In other words, the method of obtaining the first ratio Q1 is not restricted.

In the sub-step S204A, the first ratio Q is compared with a predetermined first threshold value. According to the comparing result, the detecting and controlling circuit 108 acquires the degree of imbalance between the first voltage $U_{L1N}$ and the second voltage $U_{L2N}$. In this embodiment, the predetermined reference value in the step S2 contains the first threshold value.

In the sub-step S206A, if the first ratio Q is greater than the first threshold value, it means that the degree of imbalance between the first voltage $U_{L1N}$ and the second voltage $U_{L2N}$ is very serious because the inverter 103 and the power grid 107 are disconnected. Under this circumstance, the detecting and controlling circuit 108 confirms that the rapid shutdown switch 104 is turned off. Generally, in the normal off-grid mode, there is also certain imbalance between the first voltage $U_{L1N}$ and the second voltage $U_{L2N}$ because of the load imbalance. For discriminating the abnormal situation (i.e., the emergency situation) from the normal off-grid mode, the first threshold value for determining whether the rapid shutdown switch 104 is turned off in the emergency situation should be specially determined. For example, the first threshold value is not smaller than 25% (e.g., 25%).

Figure 5:
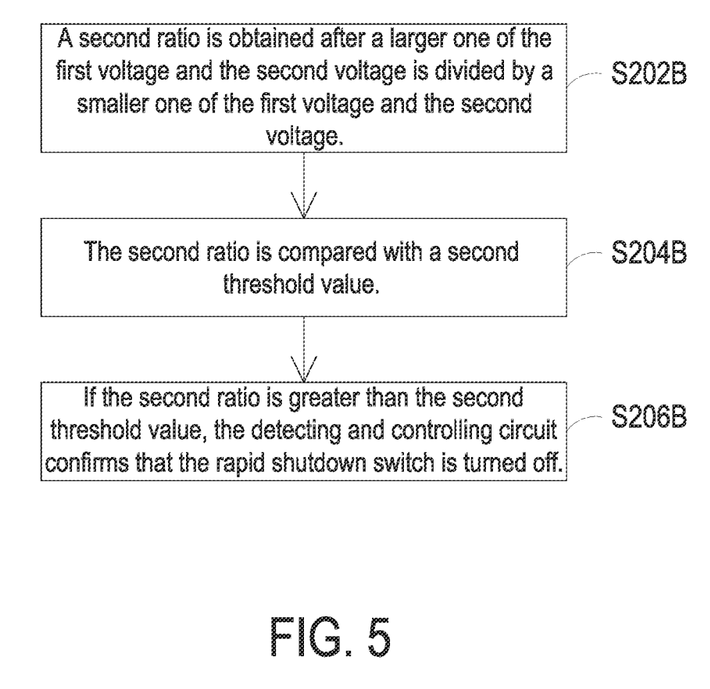
FIG. 5 is a flowchart illustrates a second example of the step S2 in the control method of FIG. 3.

FIG. 5 is a flowchart illustrates a second example of the step S2 in the control method of FIG. 3. In an embodiment, the step S2 includes sub-steps S202B, S204B and S206B. In FIG. 4, the degree of imbalance between the first voltage $U_{L1N}$ and the second voltage $U_{L2N}$ is determined by the difference between the first voltage $U_{L1N}$ and the second voltage $U_{L2N}$. In the embodiment of FIG. 5, the degree of imbalance between the first voltage $U_{L1N}$ and the second voltage $U_{L2N}$ is determined by the ratio of the first voltage $U_{L1N}$ to the second voltage $U_{L2N}$ or the ratio of the second voltage $U_{L2N}$ to the first voltage $U_{L1N}$.

In the sub-step S202B, the first voltage $U_{L1N}$ is compared with the second voltage $U_{L2N}$, wherein after a larger one of the first voltage $U_{L1N}$ and the second voltage $U_{L2N}$ is divided by a smaller one of the first voltage $U_{L1N}$ and the second voltage $U_{L2N}$, a second ratio Q2 is obtained. The second ratio Q2 can be expressed by the following mathematic formula:

$$Q2=\mathrm{Max}(U_{L1N},U_{L2N})/\mathrm{Min}(U_{L1N},U_{L2N}) \tag{4}$$

In the mathematic formula (4), $\mathrm{Max}(U_{L1N}, U_{L2N})$ is the larger one of the first voltage $U_{L1N}$ and the second voltage $U_{L2N}$, and $\mathrm{Min}(U_{L1N}, U_{L2N})$ is the smaller one of the first voltage $U_{L1N}$ and the second voltage $U_{L2N}$.

In the sub-step S204B, the second ratio Q2 is compared with a predetermined second threshold value. According to the comparing result, the detecting and controlling circuit 108 acquires the degree of imbalance between the first voltage $U_{L1N}$ and the second voltage $U_{L2N}$. In this embodiment, the predetermined reference value in the step S2 contains the second threshold value.

In the sub-step S206B, when the second ratio Q2 is greater than the second threshold value, the detecting and controlling circuit 108 confirms that the rapid shutdown switch 104 is turned off. Similarly, in the normal off-grid mode, there is also certain imbalance between the first voltage $U_{L1N}$ and the second voltage $U_{L2N}$ because of the load imbalance. For discriminating the abnormal situation (i.e., the emergency situation) from the normal off-grid mode, the second threshold value for determining whether the rapid shutdown switch 104 is turned off in the emergency situation should be specially determined. For example, the second threshold value is not smaller than 8 (e.g., 8).

Figure 6:
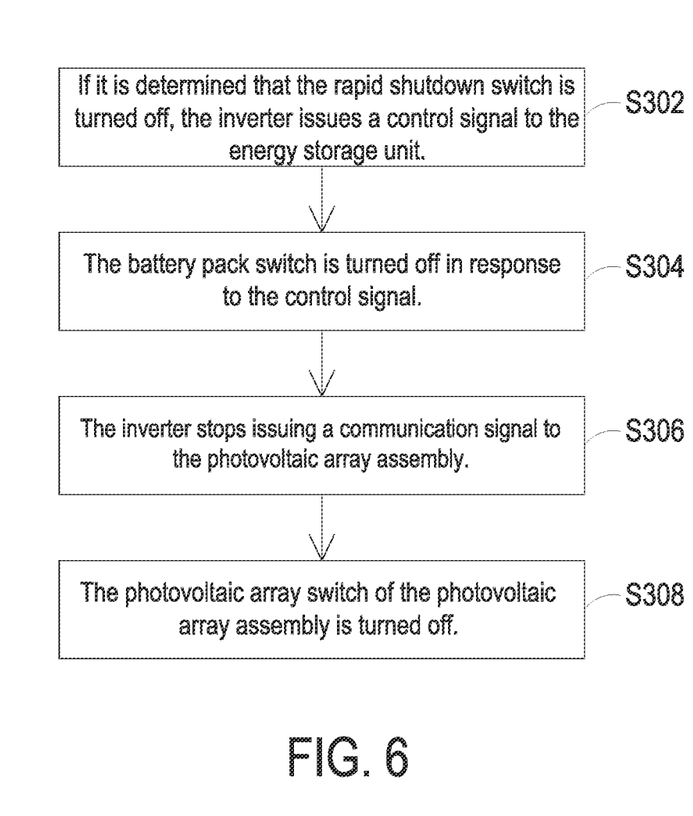
FIG. 6 is a flowchart illustrates an example of the step S3 in the control method of FIG. 3.

FIG. 6 is a flowchart illustrates an example of the step S3 in the control method of FIG. 3. In an embodiment, the step S3 includes sub-steps S302, S304, S306 and S308.

In the sub-step S302, when it is determined that the rapid shutdown switch 104 is turned off, the inverter 103 issues a control signal to the energy storage unit 102.

In the sub-step S304, the energy storage unit 102 receives the control signal from the inverter 103, and the battery pack switch 1022 is turned off through a battery management system (BMS) of the energy storage unit 102. Consequently, the connection between the battery pack 1021 of the energy storage unit 102 and the inverter 103 is cut off.

In the sub-step S306, the inverter 103 stops issuing a communication signal to the photovoltaic array assembly 101.

In the sub-step S308, the photovoltaic array switch 1012 of the photovoltaic array assembly 101 is turned off after the photovoltaic array assembly 101 has not received the communication signal from the inverter 103 for a specified time period. Consequently, the connection between the inverter 103 and the photovoltaic array 1011 of the photovoltaic array assembly 101 is cut off.

It is noted that numerous modifications and alterations may be made while retaining the teachings of the disclosure. For example, in another embodiment of the sub-step S306, the inverter 103 is further disabled to stop outputting the AC power.

Figure 7:
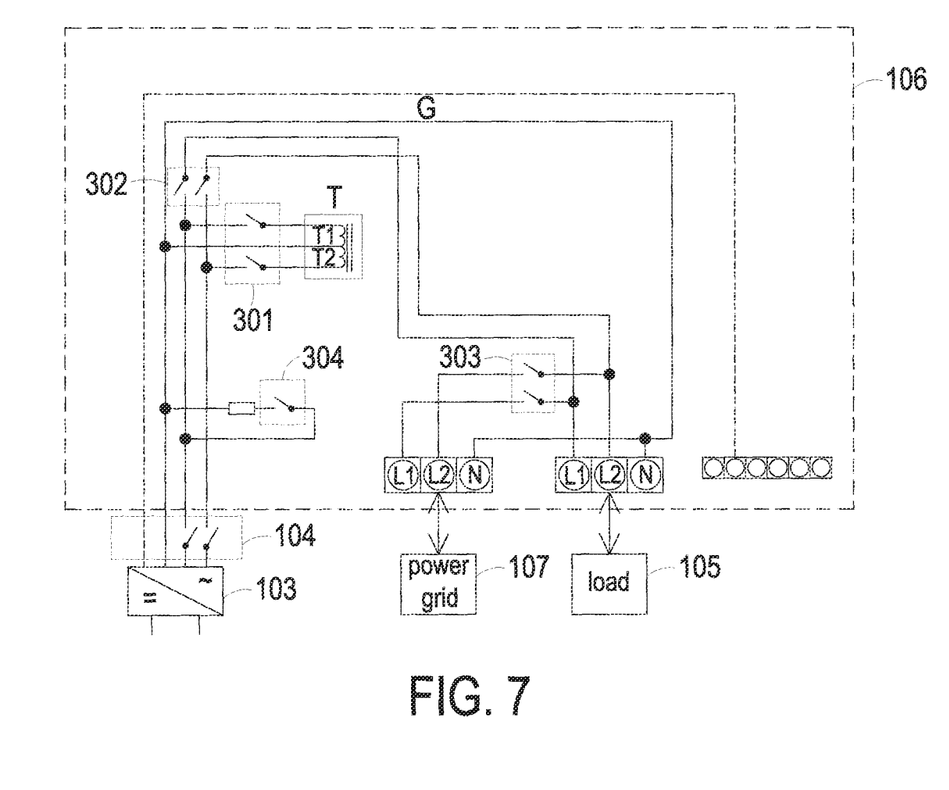
FIG. 7 is a schematic circuit diagram illustrating the circuitry structure of the automatic transfer switch in the photovoltaic energy storage system as shown in FIG. 1.

As shown in FIG. 1, the photovoltaic energy storage system further includes an automatic transfer switch (ATS) device 106. FIG. 7 is a schematic circuit diagram illustrating the circuitry structure of the automatic transfer switch in the photovoltaic energy storage system as shown in FIG. 1. The automatic transfer switch device 106 is electrically coupled between the rapid shutdown switch 104 and the power grid 107. The automatic transfer switch device 106 includes a transformer T, a first switch 301, a second switch 302, a third switch 303 and a neutral line switch 304. The transformer T includes a first winding T1, a second winding T2 and a center tap. The center tap is connected to the common node between the first winding T1 and the second winding T2. In addition, the center tap of the transformer T is also connected with the common terminal N of the inverter 103. The first switch 301 is electrically coupled with the rapid shutdown switch 104, the first winding T1 and the second winding T2.

When the photovoltaic energy storage system is in a grid-connected mode, the first switch 301 is turned off. When the photovoltaic energy storage system is in an off-grid mode, the first switch 301 is turned on and thus the first voltage $U_{L1N}$ and the second voltage $U_{L2N}$ are substantially balanced. The second switch 302 is electrically coupled between the rapid shutdown switch 104 and the load 105. The third switch 303 is electrically coupled between the power grid 107 and the load 105. A first terminal of the neutral line switch 304 is electrically coupled to the common terminal N. A second terminal of the neutral line switch 304 is electrically coupled to the first terminal L1 or the second terminal L2 of the inverter 103 through the rapid shutdown switch 104. While the photovoltaic energy storage system is switched from the off-grid mode to the grid-connected mode, the neutral line switch 304 is turned on. When the neutral line switch 304 is turned on, the first voltage $U_{L1N}$ or the second voltage $U_{L2N}$ is slightly greater than zero and the different between the first voltage $U_{L1N}$ and the second voltage $U_{L2N}$ is large.

For discriminating the normal working state from the emergency situation, the step S3 may optionally include a sub-step of comparing the smaller one of the first voltage $U_{L1N}$ and the second voltage $U_{L2N}$ with a predetermined third threshold value, and the reference value in the step S2 contains the third threshold value. When the first ratio Q1 is greater than the first threshold value and the smaller one of the first voltage $U_{L1N}$ and the second voltage $U_{L2N}$ is greater than the third threshold value, the detecting and controlling circuit 108 confirms that the rapid shutdown switch 104 is turned off. When the impedance in the circuit is taken into consideration, the third threshold value is not smaller than 30V (e.g., 30V).

From the above descriptions, the present disclosure provides a photovoltaic energy storage system and a control method for the photovoltaic energy storage system. Even if the photovoltaic energy storage system is not equipped with the additional hardware component, the photovoltaic energy storage system is capable of accurately determining the occurrence of the emergency event and cutting off the connection between the inverter and an energy storage unit and the connection between the inverter and a photovoltaic array assembly when the emergency event occurs. Consequently, the technology of the present disclosure can comply with the associated safety standards.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a photovoltaic energy storage system, the photovoltaic energy storage system comprising an energy storage unit, a photovoltaic array assembly, an inverter and a rapid shutdown switch, the inverter being electrically coupled to the energy storage unit and the photovoltaic array assembly, the rapid shutdown switch is electrically coupled to the inverter, a power grid and a load, the inverter comprising a first terminal, a second terminal and a common terminal, a voltage between the first terminal and the common terminal being a first voltage, a voltage between the second terminal and the common terminal being a second voltage, a voltage between the first terminal and the second terminal being a third voltage, the control method comprising steps of:

(S1) detecting at least two voltages of the first voltage, the second voltage and the third voltage;

(S2) determining whether the rapid shutdown switch is turned off according to the at least two detected voltages and a reference value; and (S3) when it is determined that the rapid shutdown switch is turned off, cutting off a connection between the inverter and the energy storage unit and a connection between the inverter and the photovoltaic array assembly, wherein the reference value contains a first threshold value, and the first voltage, the second voltage and the third voltage are obtained after the step S1 is completed, wherein the step S2 comprises sub-steps of:

obtaining a first ratio after an absolute value of a difference between the first voltage and the second voltage is divided by the third voltage;

comparing the first ratio with the first threshold value; and when the first ratio is greater than the first threshold value, confirming that the rapid shutdown switch is turned off.

2. The control method according to claim 1, wherein the photovoltaic energy storage system further comprises:

a transformer comprising a first winding, a second winding and a center tap, wherein the center tap is connected to a common node between the first winding and the second winding and connected with the common terminal of the inverter;

a first switch electrically coupled with the rapid shutdown switch, the first winding and the second winding; and a neutral line switch, wherein a first terminal of the neutral line switch is electrically coupled to the common terminal, and a second terminal of the neutral line switch is electrically coupled to the first terminal or the second terminal of the inverter through the rapid shutdown switch.

3. The control method according to claim 1, wherein the first threshold value is not smaller than 25%.

4. The control method according to claim 1, wherein the reference value contains a second threshold value, and the first voltage and the second voltage are detected in the step S1, wherein the step S2 includes sub-steps of:

obtaining a second ratio after a greater one of the first voltage and the second voltage is divided by a smaller one of the first voltage and the second voltage;

comparing the second ratio with the second threshold value; and when the second ratio is greater than the second threshold value, confirming that the rapid shutdown switch is turned off.

5. The control method according to claim 4, wherein the second threshold value is not smaller than 8.

6. The control method according to claim 2, wherein when the photovoltaic energy storage system is in a grid-connected mode, the first switch is turned off, wherein when the photovoltaic energy storage system is in an off-grid mode, the first switch is turned on.

7. The control method according to claim 6, wherein while the photovoltaic energy storage system is switched from the off-grid mode to the grid-connected mode, the neutral line switch is turned on, wherein the reference value further contains a third threshold value, and the step S2 further comprises a sub-step of comparing a smaller one of the first voltage and the second voltage with the third threshold value, wherein in the step S3, when the first ratio is greater than the first threshold value and the smaller one of the first voltage and the second voltage is greater than the third threshold value, it is determined that the rapid shutdown switch is turned off.

8. The control method according to claim 7, wherein the third threshold value is not smaller than 30V.

9. The control method according to claim 1, wherein the energy storage unit comprises a battery pack and a battery pack switch, which are connected with each other in series, wherein the photovoltaic array assembly comprises a photovoltaic array and a photovoltaic array switch, which are connected with each other in series, wherein the step S3 comprises sub-steps of:

when it is determined that the rapid shutdown switch is turned off, the inverter issuing a control signal to the energy storage unit;

turning off the battery pack switch when the energy storage unit receives the control signal;

allowing the inverter to stop issuing a communication signal to the photovoltaic array assembly; and turning off the photovoltaic array switch of the photovoltaic array assembly.

10. The control method according to claim 1, wherein the inverter further comprises a DC bus capacitor and a power consumption element, and the DC bus capacitor is connected with a DC side of the inverter in parallel, wherein after the step S3, the control method further comprises a step S4 of discharging the DC bus capacitor through the power consumption element.

11. A photovoltaic energy storage system, comprising:

an energy storage unit;

a photovoltaic array assembly;

an inverter electrically coupled to the energy storage unit and the photovoltaic array assembly, wherein the inverter comprises a detecting and controlling circuit, and has a first terminal, a second terminal and a common terminal, wherein a voltage between the first terminal and the common terminal is a first voltage, a voltage between the second terminal and the common terminal is a second voltage, and a voltage between the first terminal and the second terminal is a third voltage; and a rapid shutdown switch electrically coupled to the inverter, a power grid and a load, wherein the detecting and controlling circuit detects at least two voltages of the first voltage, the second voltage and the third voltage, and determines whether the rapid shutdown switch is turned off according to the at least two detected voltages and a reference value, wherein when it is determined that the rapid shutdown switch is turned off, a connection between the inverter and the energy storage unit and a connection between the inverter and the photovoltaic array assembly are cut off, wherein the reference value contains a first threshold value, and the first voltage, the second voltage and the third voltage are obtained after the at least two voltages of the first voltage, the second voltage and the third voltage are detected, wherein the detecting and controlling circuit obtains a first ratio after an absolute value of a difference between the first voltage and the second voltage is divided by the third voltage, wherein when the first ratio is greater than the first threshold value, the detecting and controlling circuit confirms that the rapid shutdown switch is turned off.

12. The photovoltaic energy storage system according to claim 11, wherein the photovoltaic energy storage system further comprises:

a transformer comprising a first winding, a second winding and a center tap, wherein the center tap is connected to a common node between the first winding and the second winding and connected with the common terminal of the inverter;

a first switch electrically coupled with the rapid shutdown switch, the first winding and the second winding; and a neutral line switch, wherein a first terminal of the neutral line switch is electrically coupled to the common terminal, and a second terminal of the neutral line switch is electrically coupled to the first terminal or the second terminal of the inverter through the rapid shutdown switch.

13. The photovoltaic energy storage system according to claim 11, wherein the first threshold value is not smaller than 25%.

14. The photovoltaic energy storage system according to claim 11, wherein the reference value contains a second threshold value, and the first voltage and the second voltage are detected by the detecting and controlling circuit, wherein the detecting and controlling circuit obtains a second ratio after a larger one of the first voltage and the second voltage is divided by a smaller one of the first voltage and the second voltage, wherein when the second ratio is greater than the second threshold value, the detecting and controlling circuit confirms that the rapid shutdown switch is turned off.

15. The photovoltaic energy storage system according to claim 14, wherein the second threshold value is not smaller than 8.

16. The photovoltaic energy storage system according to claim 12, wherein when the photovoltaic energy storage system is in a grid-connected mode, the first switch is turned off, wherein when the photovoltaic energy storage system is in an off-grid mode, the first switch is turned on.

17. The photovoltaic energy storage system according to claim 16, wherein while the photovoltaic energy storage system is switched from the off-grid mode to the grid-connected mode, the neutral line switch is turned on, wherein the reference value further contains a third threshold value, wherein when the first ratio is greater than the first threshold value and a smaller one of the first voltage and the second voltage is greater than the third threshold value, the detecting and controlling circuit confirms that the rapid shutdown switch is turned off.

18. The photovoltaic energy storage system according to claim 17, wherein the third threshold value is not smaller than 30V.

19. The photovoltaic energy storage system according to claim 11, wherein the energy storage unit comprises a battery pack and a battery pack switch, which are connected with each other in series, wherein the photovoltaic array assembly comprises a photovoltaic array and a photovoltaic array switch, which are connected with each other in series, wherein when it is determined that the rapid shutdown switch is turned off, the inverter issues a control signal to the energy storage unit, wherein when the energy storage unit receives the control signal, the battery pack switch is turned off, and the inverter stops issuing a communication signal to the photovoltaic array assembly, so that the photovoltaic array switch of the photovoltaic array assembly is turned off.

20. The photovoltaic energy storage system according to claim 11, wherein the inverter further comprises a DC bus capacitor and a power consumption element, and the DC bus capacitor is connected with a DC side of the inverter in parallel, wherein after the connection between the inverter and the energy storage unit and the connection between the inverter and the photovoltaic array assembly are cut off, the DC bus capacitor is discharged through the power consumption element.

21. The photovoltaic energy storage system according to claim 11, wherein the inverter further comprises:

a first impedance network electrically coupled between the first terminal and the common terminal of the inverter; and a second impedance network electrically coupled between the second terminal and the common terminal of the inverter, wherein an impedance value of the first impedance network and an impedance value of the second impedance network are not equal.

* * * * *